INVENTORS
Stanley W. Attwood
Arthur J. Kline Jr.

United States Patent Office 3,530,467
Patented Sept. 22, 1970

3,530,467
DUAL-MODE RANGE ACQUISITION SYSTEM
Stanley W. Attwood and Arthur J. Kline, Jr., Scottsdale, Ariz., assignors to Motorola, Inc., Franklin Park, Ill., a corporation of Illinois
Continuation-in-part of application Ser. No. 607,014, Jan. 3, 1967. This application Sept. 30, 1968, Ser. No. 768,612
Int. Cl. G01s 9/06, 9/56
U.S. Cl. 343—13                 17 Claims

ABSTRACT OF THE DISCLOSURE

A radar range acquisition system is shown which may use a pseudonoise (PN) code to detect range. In range acquisition the receiver first centers operation on a coarse quanta and simultaneously therewith operates to center on a fine quanta. After coarse range acquisition is obtained, a dual mode is initiated using half-added coarse and fine quanta signals. The receiver then tracks range using the dual signals with a controlled oscillator to adjust fine range with detected coarse range. The coarse quanta is chosen as to avoid Doppler shift in the system. When synchronized, the PN code generators are used to define the quanta in terms of elapsed time with selected ones of the high speed signals being half added with coarse quanta bits.

---

The invention described herein was made in the performance of work under a NASA contract and is subject to the provisions of Sec. 305 of the National Aeronautics and Space Act of 1958, Public Law 85-568 (72 Stat. 435; 42 USC 2457).

RELATED APPLICATION

This application is a continuation-in-part of application Ser. No. 607,014 filed Jan. 3, 1967, now abandoned.

BACKGROUND OF THE INVENTION

This invention relates to pseudonoise coded signal systems and more particularly to such systems as may be used for range detection as well as communication devices.

Problems attendant to target acquisition in a ranging system involving high acceleration airborne vehicles include (1) providing a sufficient accuracy which in turn requires a high bit rate resulting in a high Doppler shift requiring a small range cell per bit; and (2) adequate unambiguous range indications requiring a low word rate. The bit rate is defined as bits (pulse or no pulse) transmitted per unit of time, while word rate is defined as the number of repeated identical pseudonoise sequences per unit of time. These requirements demand a large number of unambiguous cells at a low word rate. The above two cited requirements are incompatible. In ranging systems especially during the target acquisition phase, such requirements make it difficult to quickly acquire target range.

Coded digital signals have been used in radar tracking and ranging systems, which when transmitted to a vehicle and returned result in received signals at the transmitter site that have additional modulation components, both as to amplitude and frequency, than present in the transmitted signals. Digital logic circuits have been used in receivers for analyzing such signals to recover the original modulation. Even with high speed digital systems, such as those mentioned, acquisition time can be quite substantial especially when the doppler effect is pronounced. Such systems have required first an extensive frequency search to find the returned signal. Upon acquisition of the returned signal, then the proper range must be detected and adjusted for the frequency shift. In using high speed digital systems with high acceleration high speed vehicles the acquisition time may be greater than the total time the target is visible to a radar set.

SUMMARY OF THE INVENTION

It is an object of the present invention to provide a radar system having low rate slow code to coarsely determine range in a ranging or tracking system which presets a high rate code for fine range determination.

It is another object of the invention to provide a radar tracking system having a low rate code and a high rate code which utilizes the slow code rate to preset the high code rate thereby eliminating most frequency or Doppler searching.

It is another object of this invention to provide a radar system which automatically switches between a coarse range measurement or slow code acquisition mode and a tracking mode using combined low word rate signal and a high bit rate signal.

It is still another object of the invention to provide a pseudonoise system having selectively combined pseudonoise codes for rapid synchronization of two such codes.

In the following description, the low rate code for coarse measurement is called the L code and the high rate code is called the H code. The H code is used for high precision and is preferably coded to minimize cross-modulation and to establish a unique correlation point. The L code is utilized to remove frequency search, and cooperates with the H code such that there is substantially no H code frequency search. This invention also provides for narrow band tracking since maximum energy is used in a combined L code and H code.

The encoder portions of the receiver or transmitter utilizing the present invention are driven by a usual frequency controlled oscillator. The output signal of a high speed coder are supplied to a plurality of detectors for controlling the operation of the system. One of the word detectors supplies pulses to a divider circuit which divides the number of output pulses by a predetermined number, such as two. The output of the divider circuit in turn drives the low speed coder synchronously with the high speed coder operation; for example, one bit of low code being generated for two repetitions of H code generation. The high speed coder provides the coding for fine range determination while the low speed coder provides the coarse range determination. In one form of the invention as applied to a ranging system, a precessing technique is used from maximum range toward minimum range to acquire target lock-on. In this particular example, it is expected that the target will be at or near or approaching maximum range at all times. In other systems, other methods of range search may be used with equal facility. This invention is best practiced with a pseudonoise code for eliminating multipath reflections.

RANGE MEASUREMENTS GENERALLY

By way of explanation range measurement in a radar set requires several steps. The first is to acquire range. That is, there first must be some time correlation of the received or reflected signal with a locally generated timing mark, or other signal modulation. This is termed range acquisition. Once range has been acquired or detected, it is often desired to keep the radar set operating with range being continuously detected. This function is termed range tracking. Then a quantitative range measurement may be made. This is done by measuring the time difference between the received signal and the transmitted signal only after an indication has been given that range has been detected and is being tracked. In reading the material on ranging, these three functions must be kept in mind.

The use of pseudonoise sequences facilitates range detection and tracking in a high noise environment. That is, it is expected to receive the reflected signal to be small with respect to its ambient noise environment. The measurement of range can then be easily made using known techniques once the range has been detected and is being tracked. Therefore, this invention is directed toward range acquisition and range tracking.

USE OF PSEUDONOISE TECHNIQUES FOR RANGING

The principles utilizing pseudonoise characteristics in communication for multipath rejections can also be used in ranging techniques. The article "A Communication Technique for Multipath Channels" by R. Price and P. E. Green, Jr., Proceedings of the IRE, March 1958, pages 555 et seq., teaches the use of statistical communication techniques and a time correlation method for multipath rejection. By the term statistical communication is meant the use of pseudonoise techniques to provide an unambiguous detection (rejection of signals from other paths). A transmitted-and-reflected (received) pseudonoise signal sequence is phase compared with a locally generated pseudonoise signal sequence and when the phases are coherent, detection is indicated. By phase coherency is meant that all of the received signals in the received sequence and in the locally generated sequence are in time coincidence, as will be more fully explained. The feature of interest to ranging is the time correlation of the two pseudonoise signals with the detection of phase coherency or time coincidence to detect (acquire) range "lock-on" (not range measurement). A system with which the present invention may be utilized is described in patent application Ser. No. 588,977 filed Oct. 24, 1966, now Pat. No. 3,461,452, by Neil Welter and assigned to the assignee of the present invention. That patent describes a time delay measurement system usable as a range detector wherein the tone/code generator 58 corresponds to the pseudonoise code generator 81 (FIG. 6) of the present specification.

The generation of pseudonoise which can be defined as maximal-length or null-sequency binary shift-register sequences are known. For example, see Zierler "Several Binary-Sequence Generators," Lincoln Laboratory, Massachusetts Institute of Technology, Lexington, Mass., Technical Report 95, Sept. 12, 1955, and Golomb, B. W. "Sequences With Randomness Properties," Glenn L. Martin Co., Baltimore, Md., Terminal Progress Report, June 14, 1955, and Huffman, B. A. "Synthesis of Linear Sequential Coding Networks," Proceedings of the Third London Symposium on Information Theory, September 1955, New York Academic Press, pages 77 to 95.

Pseudonoise signals are characterized in that they are long repeated sequences of signals that a casual observer will hear as noise. For example, such sequences may have 1,024 signal or digit positions. Each signal or digit position has a signal of first or second polarity corresponding to a binary 1 or binary 0. The signal is thus representable in binary form as the sequences of 1's and 0's which are generated in accordance with the shift register connections generating the code. When two identical sequences of 1's and 0's are time compared, accurate and reliable time correlation of the two sequences can be obtained.

Figure 9:
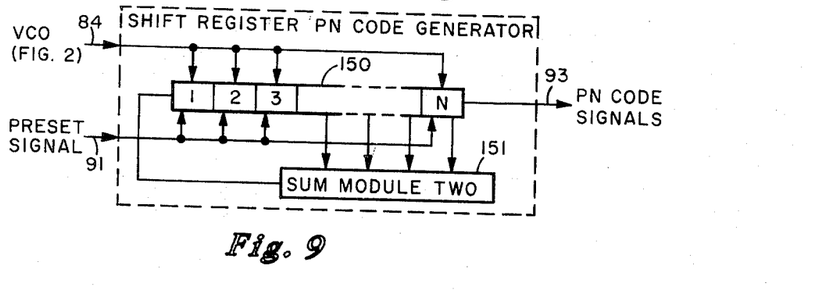
FIG. 9 is a greatly simplified block diagram of a pseudonoise generator usable with the present invention.

A shift register capable of generating a PN code is shown in FIG. 9. The stepping signal, i.e., the signal that causes the shift register 150 to shift all its stored signals one place (one digit position) to the right (i.e., to the flip-flop or stage immediately to the right of the stage storing the signal) for each incoming signal, is supplied over line 84 to all of the shift register stages 1 through N. These stages of the shift register may be flip-flops of a known type interconnected by electronic gates as is well known in the trade. Some of the shift register stages, i.e., flip-flops, are connected over lines to a sum modulo-two adder 151. The modulo-two adder 151 can be compared with a parity signal generator; that is, it supplies a two-state output signal representative of a 1 or 0 depending on whether all of the inputs are an even number of 1's or an odd number of 1's. For example, if an odd number of 1 signals is supplied from the flip-flop stages of register 150, a binary 1 signal is inserted into the first stage. If the four illustrated lines all had binary 1 signals thereon, the sum modulo-two adder 151 would supply binary 0 signals to the first stage 1. Then upon the receipt of another signal on line 84, the binary 1 signal in the first stage is shifted to the second stage and the modulo-two adder 151 again samples the four shift register stages. Let us assume that there is an odd number, i.e., three binary 1 signals and one 0 signal; a binary 1 signal is then supplied to the first shift register stage of register 150. This cycle is repeated generating a series of signals on line 93 which resemble noise and are called pseudonoise coded signals and are representative of the connection between the sum modulo-two adder 151 and the shift register stages of shift register 150. Other combinations of modulo-two signal generators may be used. Such selection is one of design choice not pertinent to the practice of the present invention.

Figure 3:
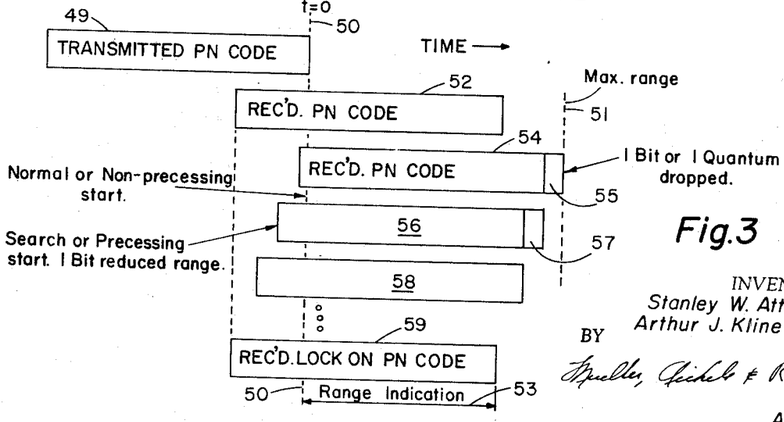
FIG. 3 is a graphical presentation of range acquisition using pseudonoise codes wherein the receiver generated code is precessed from maximum range toward minimum range.

If two shift registers, such as shown in FIG. 9, are connected identically, then the output PN code signal sequences on line 93 of both of the shift registers will be identical. If the input frequency, i.e., the pulse repetitive frequency on line 84, is identical, then the two signals may have phase coherence, i.e., each binary signal occurring in one pseudonoise sequence at a given time will be identical to a corresponding signal in a second pseudonoise sequence generated by a second shift register. If the two sequences are not in time coherence and the frequency of one of the shift registers is increased or reduced with respect to the frequency of the other shift register, there will be a precessing or shifting of phase between the two sequences, that is, the lower frequency shift register will take a longer time to generate the same sequence. Since the number of signals in each sequence remains the same because of the connection between the register 150 and the adder 151, the time of execution of the sequence is greater, therefore, there will be a shifting of phase between the two sequences. If the frequency difference is kept small, the shifting will take a long period of time. The processing action can be speeded up by dropping one digit from one sequence to bring it closer to the second sequence, such as shown in FIG. 3 and explained later. The last mentioned precessing technique of dropping a digit position is utilized in this invention to facilitate rapid coarse range acquisition. The first mentioned technique of varying the frequency is used to detect and track range to fine or small range quanta.

So correlating the two pseudonoise signal sequences is called "time correlation." A comparison of the two sequences that are not phase coherent will produce a resultant signal that is easily distinguished from the resultant signal when both sequences are phase coherent. It unambiguously detects a signal or range in or establishes a communication link in a noisy environment. Because the PN code has an extended length, i.e., a large number of signal positions, the effect of noise on the pseudonoise detection is minimal.

A present signal over line 91 presets the shift register 150 to a given signal state, therefore, both shift registers can be started from the same reference state, phase coherency can be more quickly attained. However, such preset signals are not required because in the practice of the present invention it is anticipated that a large number of sequences will be required before time correlation detection; such register will then phase shift or precess until time correlation is obtained.

PRECESSING PSEUDONOISE SIGNAL SEQUENCES FOR RANGE ACQUISITION

Assume that a pseudonoise sequence is being transmitted and then reflected by a target. The transmitter causes an identical sequence to be generated in the receiver. For illustration purposes, it is assumed that the target will be at or near maximum range of the radar set capability. Therefore, it is assumed that the maximum transit time for the reflected signal will be required. If the reflected signal is not in time coincidence with the locally generated signal sequence, then it is assumed that the target has not yet reached the maximum range or the range indicated by the elapsed time of the reflected signal as it is received at the receiver. To hasten precessing, one digit position (last digit position on signal of the sequence) of the pseudonoise sequence is eliminated hereby causing a rapid precession of the locally generated pseudonoise code sequence toward the time of occurrence of the received pseudonoise sequence even though the pulse repetitive frequency used to generate the pseudonoise code sequences is not necessarily varied. This cycle is repeated until there is some indication that there is time correlation between the received reflected signal and the locally generated pseudonoise signal sequence. This is termed coarse-range detection or acquisition. At this time the mode of operation of the receiver is changed to that of range tracking. The oscillator frequency generating the pseudonoise code is then altered such that there is synchronism, i.e., time coincidence between each and every signal in the sequence of pseudonoise signals such that range is accurately indicated (but not necessarily measured).

As used in the present invention, there are two pseudonoise generators: one for generating a coarse pseudonoise sequence and a second for generating a fine and high speed pseudonoise sequence. The two sequences are combined in the described manner to provide a dual-mode signal which both will track the coarse and fine range simultaneously as will become apparent from the reading of the specification.

SYNCHRONIZATION OF TWO UNLIKE PSEUDONOISE CODE SEQUENCES

Figure 6:
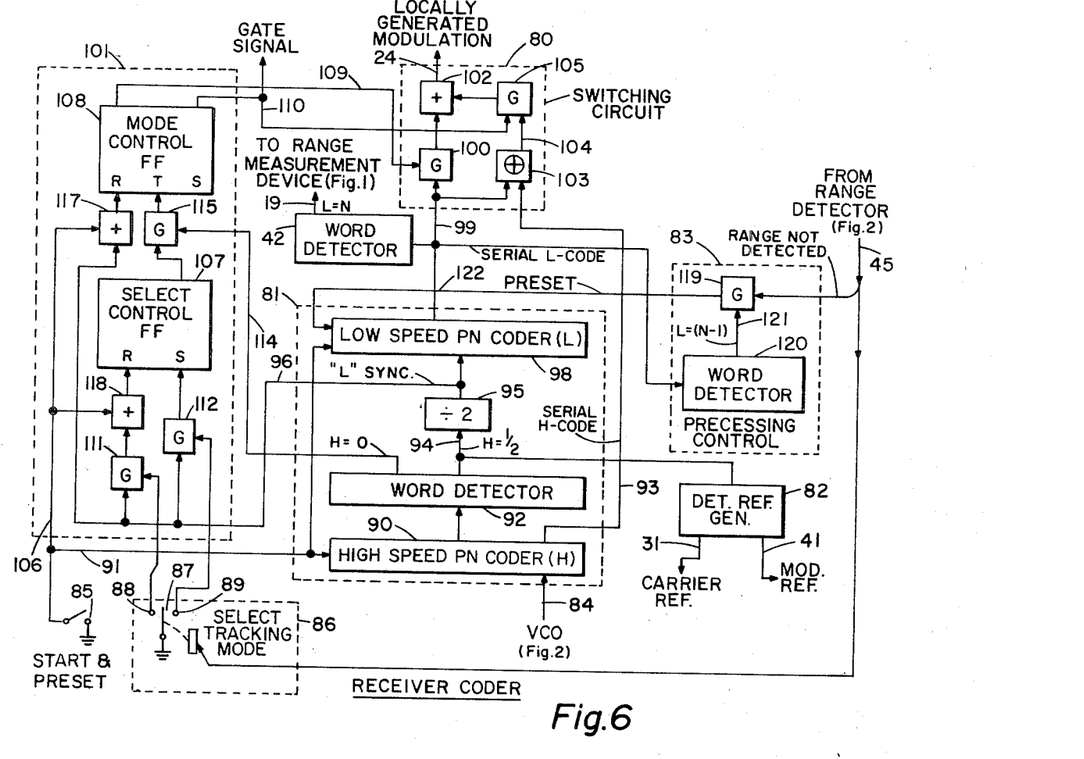
FIG. 6 is a simplified block diagram of a receiver code and control usable with the FIG. 2 illustrated receiver.

Referring to FIGS. 6 and 9 are shown two pseudonoise coders 90 and 98. The first pseudonoise coder 90 receives the VCO pulse signal over line 84 from a voltage controlled oscillator, as later described. In response to the pulses on line 84, pseudonoise coder 90 generates a predetermined pseudonoise code sequence in accordance with the interconnections of its shift register and its modulo-two counter, as is well known. The pseudonoise code generator has a predetermined sequence. This pseudonoise code sequence is generated not only in the receiver but in the transmitter 10 of FIG. 1. There are the usual time synchronism signals exchanged between the transmitter 10 and the receiver 16. The coder 90 repetitively generates this predetermined pseudonoise sequence. If a maximum length pseudonoise code sequence is generated, the shift register 150 (FIG. 9) will go through all of its possible signal state combinations; that is, those signal states represented by the flip-flops constituting the shift register being 1's to 0's and combination of those 1's to 0's. By arbitrary definition the reference state of the coder 90 is defined by a particular combination of flip-flop states in shift register 150 (FIG. 9). The coder 90 sends signals from all of its flip-flops to word detector 92 which translates or decodes the signals received into one signal representative of the reference state of coder 90 and then emits a pulse over line 114 indicated by the label H=0. This pulse indicates that the coder 90 is currently in the reference state. The next received pulse over line 84, of course, shifts the shift register 150 and alters the signal state of the coder 90 to other than the reference state. This reference state will occure once for each pseudonoise sequence generated. This H=0 pulse over line 114 is utilized in synchronizing the switching of the mode of operation between range detection and range tracking as will become apparent from the reading of the specification. Word detector 92 also has a second translation to detect the signal state combinations of the shift register 150 wherein the sequence has been halfway through the pseudonoise sequence. As a result of this translation, or decoding, a pulse is supplied over line 94 and labeled $H=\frac{1}{2}$ indicating that the coder 90 is one-half way through its pseudonoise sequence, i.e., the midpoint between two reference states indicated by the $H=0$ pulses on line 114.

Figure 4:
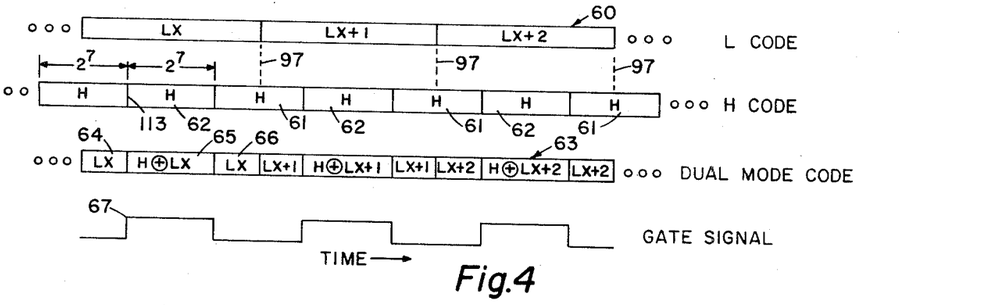
FIG. 4 is a simplified representation of signals utilized with the FIG. 1 system.

Referring to FIG. 4, this $H=\frac{1}{2}$ pulse corresponds to line 97 and wherein the H-code (from coder 90) sequence repetitions are represented by the boxes 61 and 62. Each box 61 and 62 represents a large plurality of signals constituting one H-code sequence from coder 90.

The $H=\frac{1}{2}$ pulse is supplied to a divide-by-two circuit 95 which will emit one L-sync pulse over line 96 for each two received $H=\frac{1}{2}$ pulse. A divide-by-two circuit is also often referred to as a modulo-two counter such as set forth in the book High Speed Computing Devices, McGraw-Hill Book Co., 1950, especially on page 15 et seq. Further reference to a divide-by-two circuit is deemed not necessary to the understanding of the present invention.

The L-sync pulse on line 96 is also supplied to PN coder 98 for generating a low speed PN code sequence (L-code). For each pulse received over line 96, coder 98 generates one digit position of a pseudonoise code sequence, i.e., generates one signal in a sequence of signals. Therefore, if the low speed PN coder 98 and its sequence will generate 1,000 pseudonoise signals, i.e., binary 1's or 0's, then there must be received from line 96, 1,000 L-sync pulses for generating one complete low speed pseudonoise code. In other words, there are two thousand code sequences generated by high speed pseudonoise code 90 during each low speed PN code sequence, for example.

Reference to FIG. 4 again will show that there are two H-code sequences 61 and 62 for each L-code or low speed code signal in pseudonoise code sequence 60. Therefore, there are twice the number of H-code sequences generated as the number of signals or digit positions in the L-code.

Each low speed pseudonoise code digit is generated at a particular point in the high speed pseudonoise code sequence. The two sequences are said to be synchronized at least to the bit or signal level of the high speed coder. That is, one can pick out a particular binary signal in the high speed pseudonoise code sequence and can unequivocally state that at the occurrence of that signal a new low speed pseudonoise code digit or signal is being started ($H=\frac{1}{2}$). The duration of each low speed code signal is equal in time to two high speed pseudonoise code sequences. The term synchronization as used in the specification refers to the above-described type of operation. When so synchronized, the two pseudonoise code sequences are easy to combine for providing a consistent dual-mode signal consisting of combinations of the high speed pseudonoise code sequences and the low speed pseudonoise code sequences or some algebraic or logic sum thereof as shown and described with respect to FIG. 4. In the manner both high frequency and low frequency characteristics appear in the dual-mode signal. Note that the selection $H=\frac{1}{2}$ for generating a low speed pseudonoise code or signal is an arbitrary selection. Any other portion of the high speed pseudonoise code sequence may be utilized.

Both the high speed pseudonoise coder 90 and the low speed pseudonoise coder 98 may generate different pseudonoise code sequences. The reason for this is that the reflected low speed pseudonoise code sequences are compared with the receiver generated low speed pseudonoise code sequence and the reflected high speed pseudonoise sequences are compared with the receiver generated high speed pseudonoise sequence which are respectively identical. It is also possible to use identical code sequences.

DIGITAL TECHNIQUES USED FOR ANALOG DETECTIONS

Figure 1:
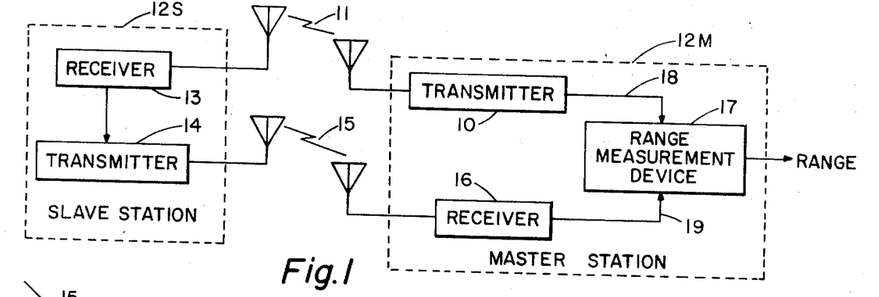
FIG. 1 is a block diagram illustrating a system utilizing the subject invention.

A range measurement as provided for in the illustrated embodiment is an analog operation, i.e., even though the range is quantized by the pseudonoise coding sequence techniques, the actual measurement is on an analog basis. The digital techniques are utilized merely to provide good range acquisition (detection) and tracking. It is remembered that the elapsed time between the transmitted pseudonoise code 49 (FIG. 3) and time of receipt of the pseudonoise code 52 indicates (in the time domain) range between the transmitter or master station 12M and the slave station 12S (FIG. 1). These analog techniques in measuring range are set forth in FIG. 2 which generates a range signal on line 19 which indicates that range has been detected. This range signal on line 19 indicating detection and tracking is indicative of the time of receipt of the reflected pseudonoise code sequence 52 and is supplied to range measurement device 17 of FIG. 1. Range measurement devices are well known and not a part of the present invention but are necessary to the actual measurement of range between the two stations 12M and 12S.

DESCRIPTION OF AN ILLUSTRATED EMBODIMENT

The FIG. 1 illustrated system used to illustrate the present invention has a master and a slave station. The master station 12M has a transmitter 10 for emitting signals to the slave station 12S. The slave station upon receiving signals processes such signals through a transponder, for example, and then returns such signals to the master station. The master station receiver 16 intercepts the returned signals and supplies them to a range measurement device 17 wherein the received signals are compared with synchronization signals provided by the master station transmitter. Typically, the master station may be a ground station and the slave station may be airborne, no limitation thereto intended.

A receiver in the above-described system used in the master station best illustrates the invention. A receiver coder generates modulation signals identical to those used by the transmitter and the receiver then compares with the received modulation signals and adjusts its operation of them until they are coincident. When such signals are coincident in time, range is detected. The operation of the receiver is such that when coarse range is being detected, i.e., initial stages of target acquisition, fine range automatically and simultaneously adjusts such that when coarse range is detected, with insubstantial Doppler effect, the range is substantially detected. When coarse range is detected the demodulation scheme is modified to incorporate both the L-code signals and the H-code signals in the same modulation. The receiver typically will have a mode control such that it can operate with the coarse or L-code or with the dual-mode code. Tracking is performed with the H-code signals while L-code signals ensure against an ambiguity in the tracking operation.

The modulation encoder used in this invention, for example, may include a high speed H encoder with a word detector and a frequency divider. The output signal of the frequency divider is in turn used to drive a low speed L-code generator. The L and H codes are then supplied to a suitable gating circuit which selects the L-code for initial acquisition or a combination of the L and H codes for final acquisition and tracking.

FIG. 1 is a simplified block diagram of a ranging system incorporating the teachings of the present invention wherein a transmitter 10 emits signals indicated by jagged line 11 from master station 12M to slave station 12S. Station 12S intercepts the emitted signals through its receiver 13 and uses transmitter 14 to return such signals to master station 12M, as indicated by a jagged line 15. Receiver 16 intercepts the returned signals 15 and then supplies range indicating signals over line 19 to range measurement device 17. Device 17 receives transmitter 10 synchronization signals over line 18 for determining range by comparison with the receiver supplied line 19 signals.

Figure 2:
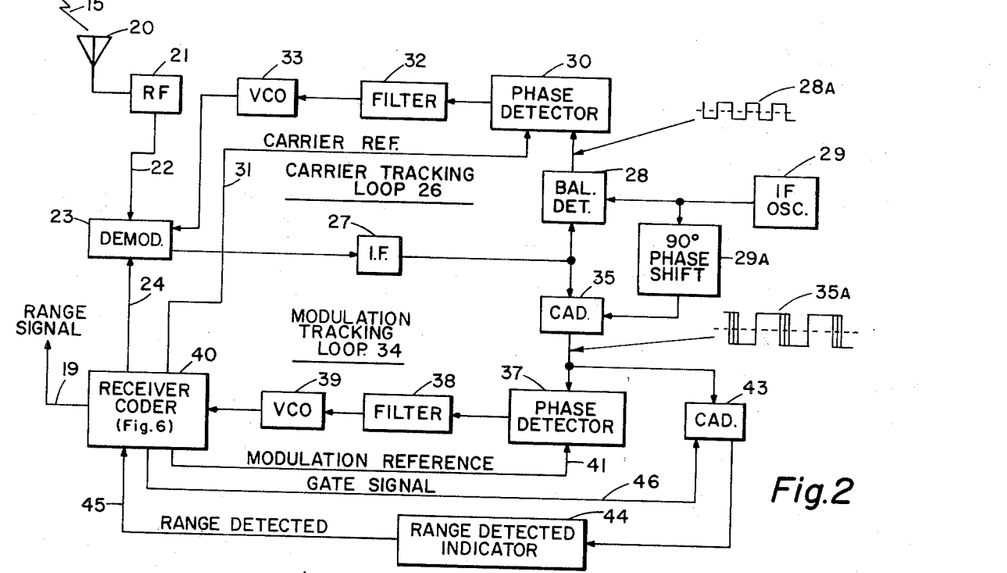
FIG. 2 is a simplified block diagram form of a receiver operable with the FIG. 1 illustrated system.

FIG. 2 illustrates a receiver embodying the teachings of the present invention and usable as receiver 16 in FIG. 1. The returned signal, indicated by jagged line 15, is intercepted by antenna 20 and supplied to RF section 21. Section 21 suitably amplifies and filters the signal and supplies it over line 22 to demodulator 23. Demodulator 23 also receives locally generated modulation input signals over line 24 from the receiver coder 40, to be described. The demodulated signal carries the time difference between modulation components of the intercepted signal and the locally generated signal as an amplitude modulation component on an intermediate frequency carrier signal. Whenever the local modulation is in time synchronization with the intercepted modulation there is a null amplitude supplied. Such a null requires the carrier and the modulation be in synchronization; at other times the amplitude of intermediate frequency signal is indicative of the time difference between the local modulation and received modulation. Carrier frequency tracking loop 26 adjusts the locally generated carrier signal according to the carrier frequency of the intercepted signal. Loop 26 includes IF amplifier 27 which supplies the amplified and filtered signal to balanced detector 28. Detector 28 receives a reference signal from intermediate frequency oscillator 29 and supplies a series of pulses 28A to phase detector 30. Phase detector 30 compares pulse signals 28A at an IF repetitive frequency with a carrier reference signal (may be pulses similar to 28A) from the receiver coder 40, as supplied over line 31. Such signals may be the gate signal 67 (FIG. 4) and as found on line 46. Phase detector 30 supplies a DC potential indicating the phase relationship between the phase of the locally generated carrier as represented in the carrier reference signal on line 31 and that of the intercepted carrier as indicated by the signal from detector 28. The detector 30 signals are filtered by narrow band filter 32; then supplied to carrier VCO 33 for adjusting its operation toward carrier synchronization. VCO 33 supplies its signal to demodulator 23, completing the carrier loop. Such a loop may be recognized as a phase-lock loop.

Modulation tracking loop 34 includes coherent amplitude detector 35 which supplies a series of pulses which vary in time as indicated by waveform 35A according to the phase difference between the locally generated modulation and the intercepted modulation. A coherent amplitude detector may consist of a phase detector having input signals in phase coherence (rather than in phase quadrature) to synchronously detect amplitude. Phase shifter 29A adjusts oscillator 29 reference signal to such phase coherence. The pulses 35A are supplied to phase detector 37 which receives a locally generated pseudonoise signal (of the same type represented by waves 35A) from receiver coder 40 over line 41, termed the modulation reference signals. When the two signals on line 41 and pulses 35A are in phase, i.e., the pseudonoise codes are in time coincidence, detector 37 supplies a null voltage to filter 38. When there is a phase difference, a corresponding DC voltage is supplied through loop filter 38 to control the modulation VCO 39. The polarity of this voltage indicates deviation of phase difference, i.e., whether the local signal leads or lags the received signal. Modulation VCO 39 supplies its signals to drive receiver coder 40, as will be described. As VCO 39 adjusts its frequency, the pseudonoise modulation supplied to demodulator 23 over line 24 is correspondingly adjusted.

Pulses 35A from detector 35 are also supplied to coherent amplitude detector (CAD) 43 wherein they are synchronously amplitude detected with gate signal 67 (FIG. 4) supplied by coder 40 over line 46. When the two signals are phase coherent at the same frequency, the output signal is a DC voltage. Otherwise, it will be essentially zero. A nonzero output signal from CAD 43 indicates range lock-on. Lock-on detection indicator 44 responds to this voltage and supplies a signal over line 45 to receiver coder 40 indicating that range has been locked-on. The receiver coder 40 is responsive to such a signal for switching the mode of receiver operation, as will be described.

Having described the general arrangement of the receiver in FIG. 2, a process of range lock-on using PN codes will be first discussed with particular reference to FIG. 3. Vertical ordinate 50 represents time equals zero, that is, the time when a last signal of a transmitted PN code 49 is emitted from transmitter 10 of master station 12M (FIG. 1). Vertical ordinate 51 represents elapsed transmission time representing maximum range. This elapsed time is twice the time it takes a radio signal to travel between the two stations 12S and 12M of FIG. 1. Box 52 represents the time that the PN code is received by receiver 16 from the slave station 12S, the length of the box indicating the length of the PN code. The range between the two stations is indicated by a horizontal distance 53. Since it is expected that the target will be at or near maximum range, the range search is initiated at maximum range and proceeds toward minimum range. Initiation of range search is indicated by the first receiver generator PN code sequence 54. Such PN code includes only the L-code as will become apparent. The elapsed time between ordinate 50 and the last bit position of the L-code is range indicated by the particular receiver generated code. Such code is generated in receiver coder 40 as later described. Upon being processed through the modulation tracking loop 34, the receiver detects there is no coincidence between the receiver PN code 54 and the received PN code 52. Then the last occurring signal (also termed "bit") 55 of code 54 representing one quantum of range, is not generated. The second receiver generated L-code 56 begins one bit period closer to ordinate 50, i.e., representing a range distance of one coarse quantum, closer to master station 12M than the first receiver generated PN code. Upon completion of the second receiver generated L-code, range lock-on also is not indicated. Correspondingly, the last bit signal 57 is not generated causing the subsequent receiver generated PN code 58 to begin one coarse range quantum closer to the master station. The above-described process, commonly referred to as precessing, is repeated until receiver generated PN code represented by box 59 is in time coincidence with the received PN code, coarse range is detected. At this instant, CAD 43 (FIG. 2) supplies a signal voltage to lock-on detector and indicator 44 which in turn indicates "range lock-on" or detection to receiver coder 40 of FIG. 2 and other equipment (not shown). It is to be understood that other forms of range searching may be used with the present invention, that the particular one described, i.e., precessing from maximum range toward minimum range, was selected only because the target was expected to be at or near maximum range before range lock-on was completed. In systems other than tracking systems using this invention, other criteria may dictate other processes of approaching coincidence of receiver and received PN code signals.

The L-code and H-codes, referred to above, will now be described with particular reference to FIG. 4. The maximum range indicated as time elapsed between lines 50 and 51 of FIG. 3 is arbitrarily divided into a plurality of quanta, each quantum is detectable only by the time coincidence of a received PN code and a receiver generator PN code as indicated in FIG. 3. In the embodiment being described, the L-code consisted of a $2^7-1$ or 127 quanta. The H-code consisted of 511 quanta ($2^9-1$) and was repeated twice for each L-code bit position. Because of the low frequency of the L-code, the Doppler shift is insignificant eliminating Doppler searching for the modulation. During the initial acquisition modes, i.e., before the target is acquired, only the L-code, represented by series of bit position signals 60 and three of which are individually labeled $Lx$, $Lx+1$ and $Lx+2$ of FIG. 4 is transmitted. This code provides a coarse range indication. The H-code indicated by boxes 61 each of which have $2^9-1$ bits or individual signals are used to generate the L-code. Each box 61 represents 511 bits or signals. Upon detection of the coarse range, the center H-codes 62, that is, the H-codes bracketed by respective bits $Lx$, $Lx+1$ and $Lx+2$ of the L-code are half-added with the respective L-code bits to produce a composite or dual signal 63 consisting of alternate L-code bits and alternate half-added (bit-by-bit addition with no carry) H and L code bits. Half-adding may be performed by known exclusive OR circuits. For example, in bit position ($x$), when that bit is equal to a binary "1" the first portion 64 will be a binary "1" signal. In the half-added portion 65, the H-code is half-added with a binary "1" to invert the H-code. Trailing portion 66 may either contain a binary "1" or a binary "0." In some embodiments of the present invention it is desired for improved lock-on capability to make the second half of the L bit a complement of the first half; such is not a requirement of the successful practice of the present invention. Clock waveform 67 is generated in coder 40 for enabling the half-add operation between the H and L codes to produce signal section 65, and periodically enabling CAD 43 (FIG. 2).

Figure 5:
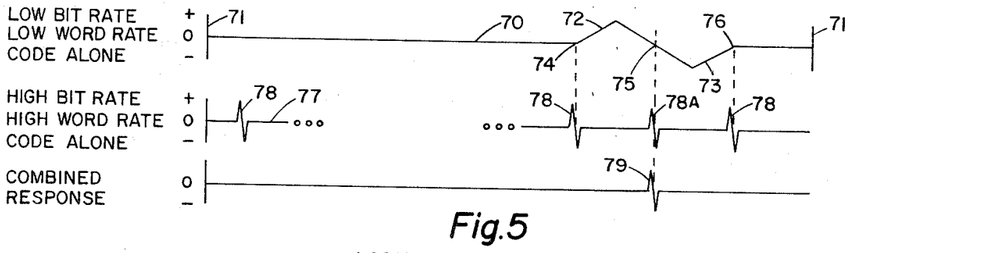
FIG. 5 illustrates in simplified form the response characteristics of the FIG. 2 illustrated receiver.

Before proceeding to a detailed description of the operation of the coders and the resultant range detection, an understanding of the response of the system will be helpful. Referring now to FIG. 5, there is shown a response curve 70 illustrating the response of the system using the L-code in determining coarse range. The distance between the two vertical ordinates 71 represents maximum range. The triangular waves 72 and 73 correspond to the response time of the receiver when using L-code acquisition. There is only one response curve 72–73 in total range; therefore, coarse range is unambiguous. The response is zero from zero range through response curve knee 74 whereupon positive going triangular response curve 72 is provided to the zero crossover 75 range as indicated and all servoing action of the receiver along the triangular wave 72–73 adjusts the receiver operation to the zero crossover 75. The horizontal spacing between knee 74 and zero crossover 75 corresponds to one L-code bit or signal duration. Correspondingly, the horizontal spacing between zero crossover 75 and knee 76 also corresponding to one L-code bit or signal duration. The curve 72–73 is effectively shifted in time between ordinates 71 until the zero crossover corresponds to detected coarse range.

The H-code responses are indicated by curve 77 having a fine or narrow triangular response 78 repeated each H-code generation. Such plural responses make range detection ambiguous. Combining the response curve 72–73 with selected H-code response 78A results in composite response 79—the FIG. 1 system response with zero crossover corresponding to range detection. Such a system response is provided in the illustrated embodiment by half-adding the H and L codes (FIG. 4) and using the half-added codes in a unique manner to accomplish range detection, as will become apparent.

Figure 8:
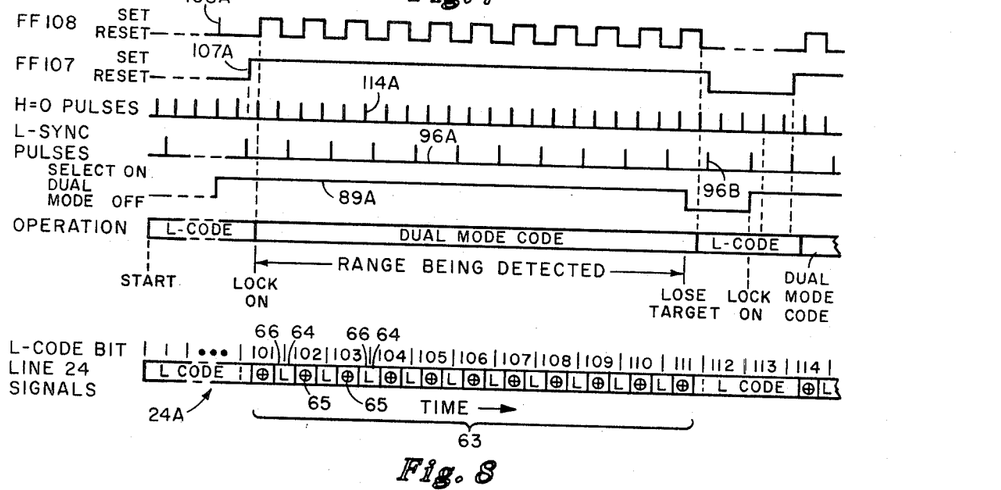

Referring next to FIG. 6, there is shown in block diagram form the receiver coder 40 which will be described and related to the other portions of the receiver and to the above-described operations. The connections between receiver coder 40 and the FIG. 2 receiver will be first described. Receiver coder 40 supplies locally generated PN modulation, shown as signal 24A in FIG. 8 with numbered L-code bits 1–114, inclusive, codes over line 24 to demodulator 23 (FIG. 2). FIG. 8 diagrammatically shows signal 24A as a high frequency portion of a dual-mode PN signal. Such modulation is selectively gated through switching circuit 80 which includes a half-adder; often termed an "exclusive OR circuit." The carrier reference signals and the modulation reference signals respectively on lines 31 and 41 are derived from signals generated in PN code generator 81 and are changed to appropriate pulse form; i.e., duration, etc., by generator 82 and supplied over the separate lines 31 and 41. The signal on line 41 corresponds to the reference signal for the modulation tracking loop 34 and the signal on line 31 is a pulse sequence providing a reference for the carrier tracking loop 26 and the CAD 43. Line 45 carries the signal indication that range has been detected. Precessing control 83 is responsive to line 45 signals to provide the FIG. 3 illustrated precessing type of range search. The termination of last bit signal (N) of the L-code is detected by word detector 42 and supplied over line 19 to range measurement device 17 (FIG. 1) wherein it is compared in the time relationship to a corresponding signal from transmitter 10 supplied over line 18. The time difference during the tracking mode is an accurate indication of range. The modulation VCO 39 (FIG. 2) supplies its signal over line 84 to PN code generator 81 for adjusting the phase of operation until there is time coincidence between the receiver generated PN code and the received PN code. In addition to the above-described connection with the receiver circuits there is provided a start and preset control switch 85 which when momentarily closed initiates tracking operation. It is understood that while a manual single-pole single-throw switch is shown, that electronic circuits not important to the practice of the present invention are utilized for initiating the tracking operation. Similarly, tracking mode selection circuit 86 is shown as consisting of a single-pole double-throw switch 87 for selecting between the coarse or L-code terminal 88 and a dual-mode operation terminal 89 resulting respectively in receiver generated codes corresponding to the FIG. 4 illustration of codes 60 and 63. It is to be understood that switch 87 in control 86 in a practical embodiment consists of electronic circuits which are responsive to indications that coarse range has been detected for initiating the dual-mode signals. Of course, other sophisticated controls may be added.

The generation of the H and L codes will now be described. Pseudonoise (PN) code generators are known in the art. The technique and equipment described by Price et al., supra, especially on page 559, may be used in the practice of this invention for the generation of PN codes. FIG. 9 shows such a PN coder receiving a VCO signal on line 84 for shifting signals in register 150 in a known manner. Predetermined stages supply signals to a modulo-two-sum circuit 151 (a toggle flip-flop, for example) which generates signals for insertion into the first stage of register 150 which generates a PN code. The Nth stage of register 150 supplies output PN coded signals over line 93. Register 150 is preset to a predetermined state by a signal on line 91. Modulation VCO 39 supplies its signal over line 84 to drive high speed PN coder 90 constructed as taught by Price et al, supra, to generate the H-code. Start and preset switch 85 supplied a signal over line 91 to preset coder 90 to an arbitrarily selected fiducial state. Such a fiducial state consists of the signal state of the nine bits; for example, all nine bits may indicate binary 0 or any other arbitrarily selected number. Coder 90 supplies its H-code signals in parallel to word detector 92 wherein various signal combinations or code states supplied by coder 90 are detected. The H-code signals 61 (FIGS. 4 and 7) are also supplied serially over line 93 to gating circuit 80 wherein such signals are selectively combined with the L-code signals as later described. Word detector 92 has several output connections corresponding to different detected H-code combinations or states. The first state described is when the H-code is one-half way through its code sequence and is indicated by pulses 94A (FIG. 7) over line 94 to "divided-by-two" circuit 95. Divide-by-two circuit 95 emits one pulse 96A (FIGS. 7 and 8) on line 96 for every two pulses 94A received on line 94 and may consist of a modulo-two counter. Referring momentarily to FIG. 4, the H equals one-half pulse on line 94 corresponds to the midpoints in time of the various H-code repetitions 61. Each of the L-code bits 60 (FIGS. 4 and 7) begins at a halfway mark 97 (FIGS. 4 and 7) of every other H-code repetition 61. When an H-code repetition 61 has reached a midpoint 97, pulses 96A indicate that a new L-code bit should be generated. The divide-by-two circuit 95 selects every other H-code repetition and increments low speed coder 98 to generate a new L-code state. The pulse 96A on line 96 is also termed "L-sync" as it provide synchronization signals corresponding to the generation of a new L-code state. The time of occurrence of the L-sync pulse is adjusted by the modulation VCO 39 (FIG. 2) through the action of modulation tracking loop 34 and adjusts the fine range indication through the H-coder 90 driving the L-coder 98. Low speed coder 98 supplies the L-code bit signals serially over line 99 to switching circuit 80, and to precessing control 83.

Switching circuit 80 serially receives both the L-code signals 99A (FIG. 7) over line 99 and the H-code signals 62 (FIG. 7) over line 93 and selectively combines them for providing locally generated modulation (pseudo-noise code) over line 24 to demodulator 23 of FIG. 2. In the initial stages only the L-code is supplied (see FIG. 8). Gate 100 is continuously held open by mode control circuit 101, as later described, to continuously pass the L-code bits through OR circuit 102 and thence line 24. Upon detection of coarse range, i.e., "lock on" in FIG. 8, the tracking mode control switch 87 is responsive to the signal on line 45 to automatically set switch 87 to dual-mode terminal 89 which is operative to close gate 100 and open gate 105 for passing combined signals from exclusive OR (half-adder) circuit 103 (of known design) to line 24. The L-code bits on line 99 and the line 93 H-code bits are continuously supplied to half-adder 103. The half-added bits are continuously supplied over line 104 to gate 105, selectively held open during the dual mode as will be described for generating portions 65 (FIG. 4) for forming the composite signal. From gate 105 such signals are supplied through OR circuit 102 to line 24. In FIG. 8, L-code bits 1–100 represent the initial operation, while bits 101 through 111 represent the situation when range is being successfully detected.

The formation of signal 63 (FIGS. 4, 7 and 8) consisting of portions 64 and 66 of L-code bits, together with the half-added portion 65, will now be described. During L-code portions 64 and 66 (FIG. 4) gate 100 is opened by mode control 101 and gate 105 is closed; however, during the generation of portion 65 (the half-added portion) gate 100 is closed while gate 105 is opened to pass the half-added H and L-code bit signals. This selective opening and closing of the gates 100 and 105 is repeated for each successive L-code bit 60. Referring now to the mode control circuits 101, upon starting, switch 85 supplies a momentary signal over line 106 resetting select-control flip-flop 107 and mode control flip-flop 108. Flip-flop 107 is connected to a resynchronization circuit necessary to ensure that the mode control flip-flop 108 switches states at the appropriate times. When mode control flip-flop 108 is in its reset state, a gate enabling or opening signal 109A (FIG. 7) is supplied over line 109 to open gate 100; while when in the set state a gate enabling signal 67 (FIGS. 4, 7 and 8) is supplied over line 110 to open gate 105 for passing the half-added signals from half-adder 103. Therefore, it is seen that when the circuit is started, gate 100 is opened for passing the L-code bits for initial acquisition as discussed before.

When tracking mode selection circuit 86 has switch 87 set to terminal 88, gate 111 is opened for repetitively resetting select control flip-flop 107 by the L-sync pulses 96A from line 96, that is, each time an L-code bit 60 (FIG. 4) is initiated. When switch 87 is set to terminal 89, the gate enabling input to gate 112 is grounded, as indicated by signal 89A (FIG. 8). Gate 112 connected to the set input of select control flip-flop 107 is then enabled, by signal 89A (FIG. 8) while gate 111 is disabled or closed. Known biasing circuits for disabling gates 111 and 112 when switch 87 is not set to the respective terminals 88 and 89 are incorporated in the gates. Gate 112, when enabled, passes the L-sync pulse 96A from line 96 to set select control flip-flop 107.

When set, flip-flop 107 causes composite or dual signal 63 (FIG. 4) to be generated. The first portion 64 of the subsequent L-bit following the setting of control flip-flop 107 will continue to be passed through gate 100 while gate 105 remains closed. When the H-coder 90 reaches its fiducial mark (indicated as $H=0$), corresponding to the vertical line 113 of FIG. 4, word detector 92 emits an H-code fiducial pulse 114A (FIGS. 7 and 8) over line 114.

Figure 7:
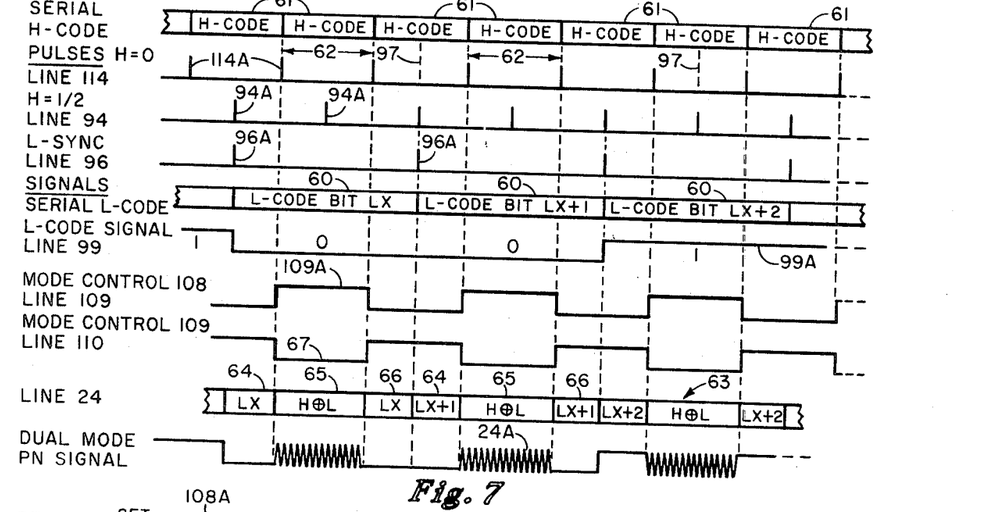
FIGS. 7 and 8 show idealized waveforms illustrating the operation of the preferred embodiment but with substantially different time scales.

Select control flip-flop 107 being set enables or opens gate 115. The H-code fiducial pulse on line 114 is passed by gate 115 to toggle the mode-control flip-flop 108, thereby disabling gate 100 and enabling gate 105 for blocking the L-code and passing the half-added signals of H and L-codes to line 24 forming dual-mode code portion 65 (FIG. 4). Gate 105 remains open until the next succeeding H-code fiducial pulse 114A again is supplied through gate 115 to retoggle the mode-control flip-flop 108 to its reset state opening gate 100 and closing gate 105, to pass portion 66 (FIG. 4) of dual-mode signal 63. This action is repeated once each L-code bit forming the succession of dual-mode signals 63 as shown in FIGS. 4, 7 and 8 in varying time scales. The above-described dual-mode signal generation is used when the receiver has detected range and is tracking the target (not shown).

L-sync line 96 in addition to supplying L-sync pulses 96A to gates 111 and 112 also is connected through OR circuit 117 to reset mode control flip-flop 108. The L-sync pulses 96A signify the beginning of an L-code bit, i.e., line 97 (FIG. 4). Such synchronization is required only when tracking is deactivated by mode selection circuit 86 again enabling gate 111 as initiated by a signal on line 45 indicating range is not detected. Such action occurs when the target is lost, as shown between L-code bits 111 and 112 in FIG. 8, and it is desired to return to an L-code or acquisition mode. The first L-sync pulse 96A (FIG. 8) on line 96 (occurring subsequent to moving switch 87 from terminal 89 to terminal 88) passes through gate 111 and OR circuit 118 resetting select-control flip-flop 107. It is also supplied through OR circuit 117 resetting mode control flip-flop 108 irrespective of the state of flip-flop 107. Simultaneously, gate 115 which toggles mode control flip-flop 108 is disabled, as shown by signal 107A (FIG. 8) returning to the reset state. With flip-flops 107 and 108 both in the reset state (signals 107A and 108A of FIG. 8), the gate 100 is continuously enabled for passing only the L-code to line 24 for supplying L-code locally generated modulation to demod 23 of FIG. 2. Upon reestablishment of range detection, as between L-code bits 113 and 114 in FIG. 8, the dual-mode code generation is again initiated, as aforedescribed.

Precessing control 83 receives a null signal over line 45 for performing the precessing operation described with respect to FIG. 3. Gate 119 is responsive to such null signal for passing pulses from word detector 120. (Gate 119 may include an inverting circuit connecting the null to a gate opening signal, and vice versa.) Word detector 120 detects the L-code state immediately before the last occurring (Nth) state in an L-code repetition before an L-code fiducial mark is generated. For an N state code sequence, the term $L=(N-1)$ represents such code state. For example, in a straight binary counter the maximum count is indicated by all ones in the counter. This count can correspond to the last code state in a pseudonoise code generator. It is understood that other combinations by adjusting the coder such as taught in the above referenced article by Price et al. may be used to indicate the last occurring state in a coder. The count occurring just before the maximum count in a straight binary counter is all ones in all positions except the least significant bit position which is a zero. Word detector 120 detects such a condition, i.e., the state in the coder or numerical representation in the coder which is the next to the last pseudonoise code state. Upon completion of such code state, i.e., when the code states are changing from $(N-1)$ to N, pulse is emitted on line 121 and passed by gate 119 to line 122 presetting low speed coder 98 to its fiducial state eliminating the last L-bit (N) as described in FIG. 3. When range is detected, gate 119 is disabled or closed and therefore the presetting pulse for causing precessing is blocked.

There are two H-code repetition sequences for each L-code bit, no limitation thereto is intended. Further, each L-code bit or pulse brackets an H-code repetition. When the bracketed H-code is centered forming the dual-mode signal 63 of FIG. 4 optimum operation is provided. Other placements of the H-code with respect to the bracketing L-code bit may be provided and still be within the scope of the present invention.

The type of coding system using pseudonoise codes with a dual mode as described with respect to FIG. 4 can be used in speech privacy systems. Such a system provides a rapid acquisition of the transmitted code such that the information being transmitted could be quickly decoded.

We claim:
1. A system using pseudonoise techniques, including the following in combination,
    mean for repetitively generating a first pseudonoise code consisting of signals in successive signal states, each repetition having a first duration,
    means for generating signals in successive signal states indicative of a second pseudonoise code with each signal bracketing in time respectively certain repetitions of said first pseudonoise signals,
    gating means for combining said first and second signals and causing each repetition of said first pseudonoise signal as combined to be related to the second pseudonoise signal bracketing such repetition.
2. The system of claim 1 wherein said signals are binary signals and said combination of said first and second signals is an exclusive OR combination.
3. The system of claim 1 including pseudonoise generation state detecting means responsive to a selected state of said first code signal generation to supply an output signal, and
    said second signal means being responsive to said output signal for generating a successive second code state.
4. The system of claim 3 wherein said output signal is generated during alternate first code repetitions.
5. The system of claim 4 wherein said selected state is the midpoint of said first duration.
6. The system of claim 3 further including
    means receiving an input signal and jointly responsive to said combined first and second signals and said input signal to supply a system status signal, said combining means being responsive to one of said status signals to stop combining said first and second signals when the status so indicates and simultaneously actuating said receiving means to be jointly responsive to said second signal and said input signal.

7. The system of claim 6 further including precessing control means receiving said first and second code signals and detecting a code generation state in each repetition adjacent the last state in such repetition, and means responsive to said status signals to inhibit the generation of the last state of said second code signals when the status so indicates.

8. A pseudonoise code signal generator, including in combination, high speed means for repetitively generating in successive code states a first pseudonoise code consisting of a multiplicity of successively generated unique signal combinations each combination being repeated in respective first intervals of time with a fiducial combination of signals indicating beginning of each successive time interval and supplying a sequence of pulses indicative of such succession of signal combinations, detector means responsive to a certain one of said signal combinations for emitting a pulse indicating a certain code generation state, low speed means connected to said detector means and responsive to said emittted pulse for repetitively generating a second pseudonoise code in successive code states consisting of a second multiplicity of successively generated unique signal combinations with each unique signal combination having a duration longer than said first interval of time and supplying a sequence of pulses indicative of such low speed succession of signal combinations, switching means connected to both said code generating means for selectively combining said pseudonoise code indicating sequences of pulses in a predetermined manner to supply a composite serial code signal.

9. The pseudonoise code signal generator of claim 8 wherein said emitted pulse is supplied at the midpoint in time of alternate successive ones of said first time intervals.

10. The pseudonoise code signal generator of claim 9 wherein said switching means combines said second code indicating pulses with said first code indicating pulses occurring intermediate said alternate ones of said first time intervals and supplies said second signals intermediate said combined signals for forming said composite signal.

11. The pseudonoise code signal generator of claim 8 wherein said detector means is further responsive to said fiducial combination of signals to emit an L-sync pulse, control means responsive to said L-sync pulse to generate a gating signal having alternating gate enabling and blocking signal states corresponding to successively received L-sync pulses, said switching means including a half-adder receiving said first and second code indicating pulses and supplying sum signals indicative of a half-add addition of said indicating pulses and gating means responsive to said gate signal to form said composite signal by passing said first code indicating pulses in response to said gate signal blocking state and passing said sum signals in response to said gate signal enabling state.

12. A radar receiver having means for intercepting and means for demodulating radar tracking signals with pseudonoise modulation thereon and having an IF reference signal source and a carrier tracking loop for frequency tracking the intercepted signal and a modulation tracking loop for generating control signals for adjusting receiver operation according to comparisons of received modulation and locally generated modulation, with the loops being jointly responsive to intercepted signals and the reference signal to adjust receiver operation to track the intercepted signal, the improvement including in combination, a receiver coder in said modulation tracking loop having a high speed pseudonoise coder receiving one of the control signals indicative of modulation comparisons from said modulation tracking loop for adjusting its frequency of operation in generating successive first pseudonoise code signal states, and supplying parallel and serial signals indicative of such states, a word detector connected to said high speed coder receiving said pseudonoise code parallel signals for detecting certain code states of said coder and supplying output pulses in response to detection of selected ones of said code states, frequency dividing means connected to said detector for receiving and frequency dividing received first ones of said output pulses, a second pseudonoise coder connected to said frequency divider and responsive to frequency divided first ones of said output pulses to generate a second pseudonoise code and supplying parallel and serial signals indicative of successive second pseudonoise code states, switching means connected to said coder for receiving both of said pseudonoise code serial signals and for selectively combining such serial signals into a composite signal or selectively passing only serial signals indicating one of said codes to the demodulating means, control means connected to said switching means and responsive to another of the control signals said modulation tracking loop which indicates status of range detection when indicating range is not detected to supply a first gate signal to cause said switching means to pass only one of said pseudonoise coded serial signals and when range is detected to supply a second gate signal to cause said switching means to selectively combine said first and second pseudonoise code serial signals.

13. The combination as in claim 12 further including precessing control means connected to said modulation tracking loop for receiving said another control signal and receiving said second pseudonoise code parallel signals, word detector means responsive to a certain state of said second pseudonoise code parallel signals to emit a precessing control pulse, gate means jointly responsive to said precessing control pulse and said another control signal indicating range is not detected to preset said second coder for inhibiting same from generating all of said codes of a given repetition and, further responsive to said another control signal when range is detected to permit said second coder to generate all pseudonoise code signal states.

14. The combination of claim 12 wherein said modulation tracking loop includes coherent amplitude detector means jointly responsive to the intercepted signals, the IF reference signal and said second gate signal to supply said another control signal.

15. The combination of claim 12 wherein one repetition of said successively generated first code signal states occurs during a first time period, and said dividing means dividing said first ones output pulses by two and said first one output pulses being supplied by said detector means at a midpoint in time of said first time interval.

16. The combination of claim 15 wherein said detector means supplies L-synch pulses in response to a fiducial one of said code states, control means responsive to said L-sync pulse to generate a gating signal having alternating gate enabling and blocking signal states corresponding to successively received L-sync pulses, said switching means including a half-adder receiving said first and second code indicating serial signals and supplying sum signals indicative of a half-add addition of said indicating serial signals, and gating means responsive to said gate signal to form said composite signal by passing said first code indicating serial signals in response to said gate signal blocking state and passing said sum signals in response to said gate signal enabling state.

17. A system using pseudonoise techniques, including in combination, means for repetitively generating a first pseudonoise code consisting of a plurality of signals in successive signal states, each repetition having a first duration, said means supplying signals in parallel sets and a succession of first binary signals representative of said pseudonoise code within each repetition, pseudonoise generation state detecting means responsive to first and second states of a parallel set of said first pseudonoise code signals to supply first and second output pulses for each occurrence of such states, respectively, circuit means responsive to a predetermined number of said first output pulses to supply an L-sync pulse, second pseudonoise generating means responsive to said L-sync pulse to generate a new pseudonoise signal state and supplying a second binary signal indicative of said new signal state of said second pseudonoise code, a succession of said binary signals indicating said second pseudonoise code, control means capable of supplying first and second control signals and connected to said state detecting means and responsive to said second output pulse to alternately supply said first and second control signals, switching means receiving said binary signals and respectively responsive to said first and second control signals to supply output signals consisting of said second binary signal or a half-added combination of said first and second binary signals, and utilization means receiving said output signals and performing a function with said output signals and supplying an indicating signal to said first pseudonoise code generating means for adjusting its rate of code signal generation in accordance with the function being performed.

References Cited
UNITED STATES PATENTS

| | | | |
|---|---|---|---|
| 3,037,166 | 5/1962 | Alexander | 343—13 X |
| 3,046,545 | 7/1962 | Westerfield | 343—17.1 X |
| 3,223,998 | 12/1965 | Hose | 343—6.5 X |
| 3,300,780 | 1/1967 | Mason | 343—12 |
| 3,377,590 | 4/1968 | Wendell | 343—12 |
| 3,447,155 | 5/1969 | Webb | 343—13 |

RICHARD A. FARLEY, Primary Examiner

M. F. HUBLER, Assistant Examiner

U.S. Cl. X.R.

343—6.5